Aug. 12, 1969   E. A. BREACKER   3,460,773
AUTOMATIC REWINDING APPARATUS
Filed April 23, 1965   7 Sheets-Sheet 1

Aug. 12, 1969　　　E. A. BREACKER　　　3,460,773
AUTOMATIC REWINDING APPARATUS
Filed April 23, 1965　　　　　　　　　　　　　7 Sheets-Sheet 2

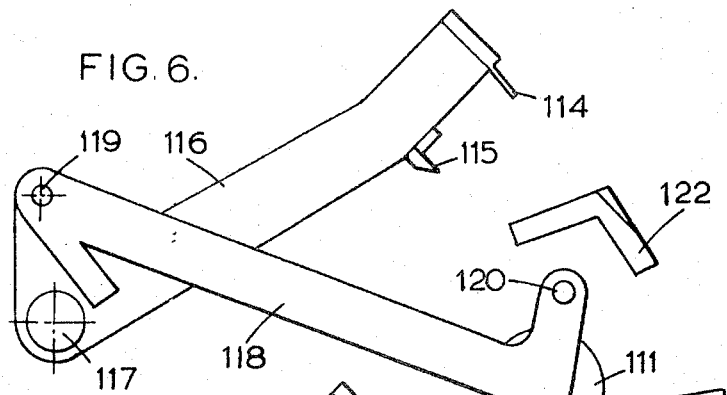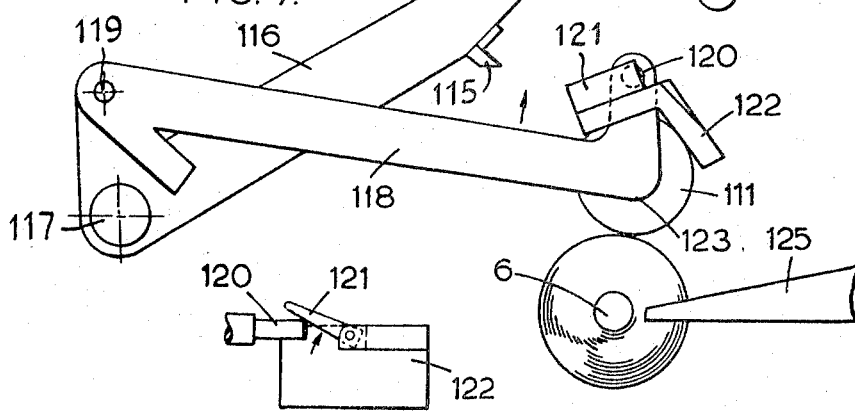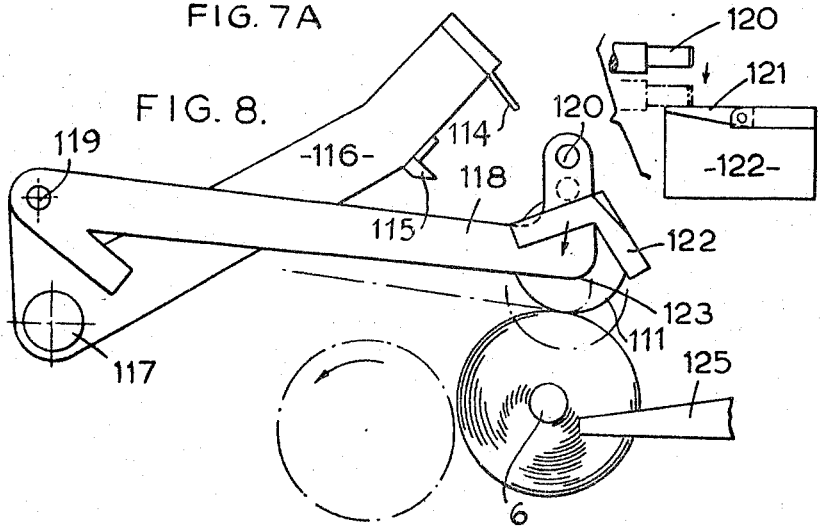

Aug. 12, 1969  E. A. BREACKER  3,460,773
AUTOMATIC REWINDING APPARATUS
Filed April 23, 1965  7 Sheets-Sheet 5

Aug. 12, 1969  E. A. BREACKER  3,460,773
AUTOMATIC REWINDING APPARATUS
Filed April 23, 1965  7 Sheets-Sheet 7

United States Patent Office 3,460,773
Patented Aug. 12, 1969

3,460,773
AUTOMATIC REWINDING APPARATUS
Edward A. Breacker, London, England, assignor to Societe d'Etudes de Machines Speciales
Filed Apr. 23, 1965, Ser. No. 450,312
Int. Cl. B65h 35/04, 75/34
U.S. Cl. 242—56.6                    15 Claims

ABSTRACT OF THE DISCLOSURE

The present apparatus is for rewinding a web into separate rolls on one mandrel at a time with a plurality of said mandrels being detachably positioned on a rotatable turret with means for rotating the turret intermittently to locate one mandrel at a time at a web rewinding station, means for driving each mandrel at said station to rewind the web on the rotating mandrel, means for displacing the rewound mandrel from the rewinding station and replacing it by an empty mandrel carried in an adjacent mounting, a guillotine for severing the web after the rewound mandrel has been so displaced and means for engaging the severed supply end of said web with a slot in said empty mandrel.

---

This invention relates to an automatic slitting and/or rewinding machine or apparatus of a type particularly, although not exclusively, for use in re-winding large webs of paper or cut sheets into smaller rolls.

Paper is normally supplied from paper manufacturers in large webs which is required to be printed, cut, and rewound into rolls of similar or different sizes for various purposes.

In order to carry this out it has been known for many years to re-wind a web, through a printing mechanism, into a number of smaller rolls, but while the printing cycle has been fully automatic the necessary control for the cut-off and re-winding cycle into smaller rolls has been either manual or semi-automatic.

It is therefore one of the objects of this invention to provide apparatus capable of automatically carrying out all of the functions required for producing a plurality of rolls of paper, or other material, from cut sheets or from a manufacturer's web of paper. The apparatus may be connected, if desired, with an inline printing machine such as that sold under the trademark Chambon, and may produce rolls varying from approximately 1" to 15" in diameter, either with or without a center core.

In order to carry out the object of the invention the following functions should be carried out. The manufacturer's web of paper should be initially mounted at one end of the apparatus and wound through the printing mechanism and then passed through a series of parallel knives adapted to slit the paper into tapes, each of the desired width, for forming the requisite rolls. The tape should then be wound on a mandrel until either a predetermined number of turns has been made on each roll, or the roll has been built up to a predetermined diameter. At this time the mandrel has to be removed from the winding mounting and replaced by a fresh mandrel for winding a new series of rolls. In order that this may be done the tape of each roll must be cut adjacent the wound mandrel, and the new end of each tape attached to the fresh mandrel in order that the cycle may recommence. Simultaneously the full mandrel should be moved away from the winding station to an automatic unloading mechanism.

The unloading apparatus of the invention requires only one operator who is required to remove the full mandrel from the re-winding apparatus, slide the rolls from the mandrel, and to replace the then empty mandrel into a storage position in the apparatus. In addition, the operator may secure the ends of each of the rolls with an adhesive paper to prevent the rolls unravelling. A loading mechanism may then automatically return an empty mandrel from the storage position back into a required mounting of the apparatus at the required time.

The apparatus of the invention may comprise a turret having a plurality of mountings mounted around its periphery which turret is adapted to rotate in a pre-determined direction to bring successive mountings adjacent the rewinding station. Each mounting may incorporate a mandrel which is adapted to be brought into engagement with driving rollers associated with the re-winding station. The movement of the turret mountings between successive mountings may be controlled electronically by a programming unit, which may either directly or indirectly cause the successive functions to come into operation.

When a full mandrel moves from the re-winding mounting and a fresh mandrel is substituted, a cutting knife may come into operation to sever the tape from the wound rolls. At this stage the fresh empty mandrel is in the re-winding mounting, and it is angularly displaced about its longitudinal axis by a mandrel alignment arm to ensure that a slot contained therein is in the uppermost position to allow the free end of the tapes to be inserted therein. The driving cycle for re-winding the new mandrel may then be recommenced, the full mandrel being retained on the turret until it has been successively moved to the automatic unloading mechanism. When the rolls have been manually detached from the mandrel it may be replaced on a storage position adjacent a loading mechanism which is adapted to automatically allow one empty mandrel to return to the turret during each successive change of mounting at the re-winding station.

According to the invention apparatus for re-winding a web in a series of separate rolls comprises a rotatable turret having a plurality of mountings for rotatable mandrels distributed about its periphery, means for rotating the turret intermittently, indexing means for registering the turret in a plurality of angular positions in each of which a mandrel carried on said turret is located at a station for receiving and re-winding web drawn from a source of web, means for rotating at least the mandrel that is located at said station to re-wind the web thereon, a guillotine adapted to sever the web at or near said station and means for engaging the severed end of the web with the empty mandrel, wherein, on receipt of a pre-determined signal, the rotation of the mandrel then disposed at said station is discontinued, said turret is angularly displaced through an angle less than or equal to that between adjacent mountings to displace said wound mandrel from said station and permit replacement of it by an empty mandrel, during or after which the guillotine is operated to sever said web and the web engaging means is actuated to engage the said severed end with the empty mandrel.

One embodiment of the invention will now be described by way of example only with reference to the accompanying drawings in which:

FIGURES 6, 7, 8 and 9 show successive positions of the pressure roller as shown in FIGURE 4.

FIGURES 7A and 8A are fragmentary front views showing successive positions of the pressure roller, detent and platform during the operation as shown in FIGURES 7 and 8.

FIGURE 1 shows the mode of operation of the apparatus generally and this operation will be described generally in detail with reference to the other drawings later in the specification.

Figure 2:
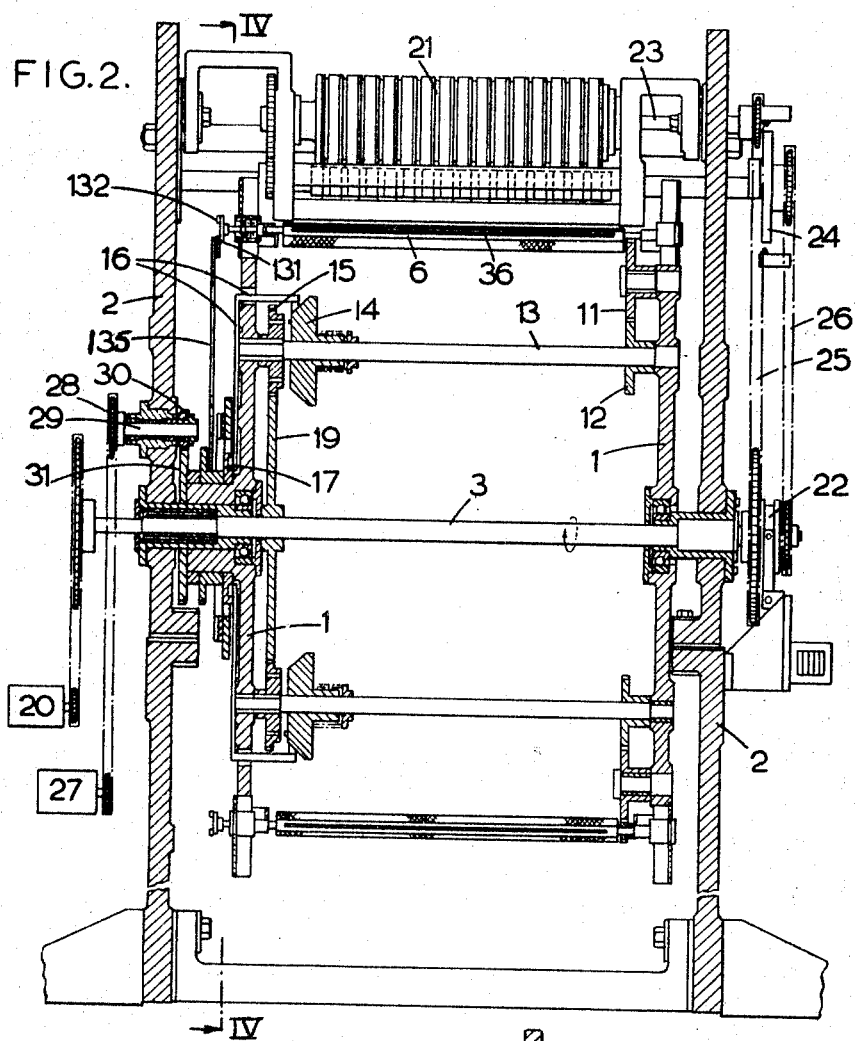
FIGURE 2 is an axial section of the turret and associated apparatus.
Figure 3:
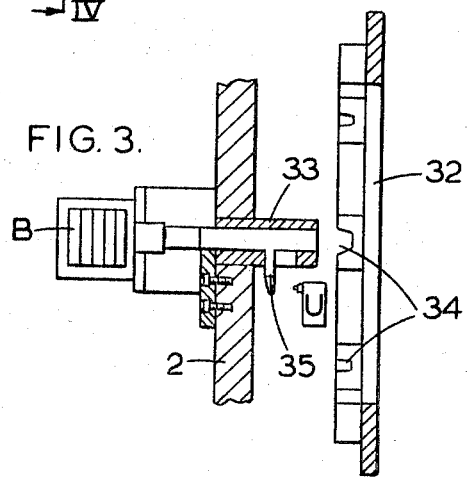
FIGURE 3 is a detail of FIGURE 2.
Figure 4:
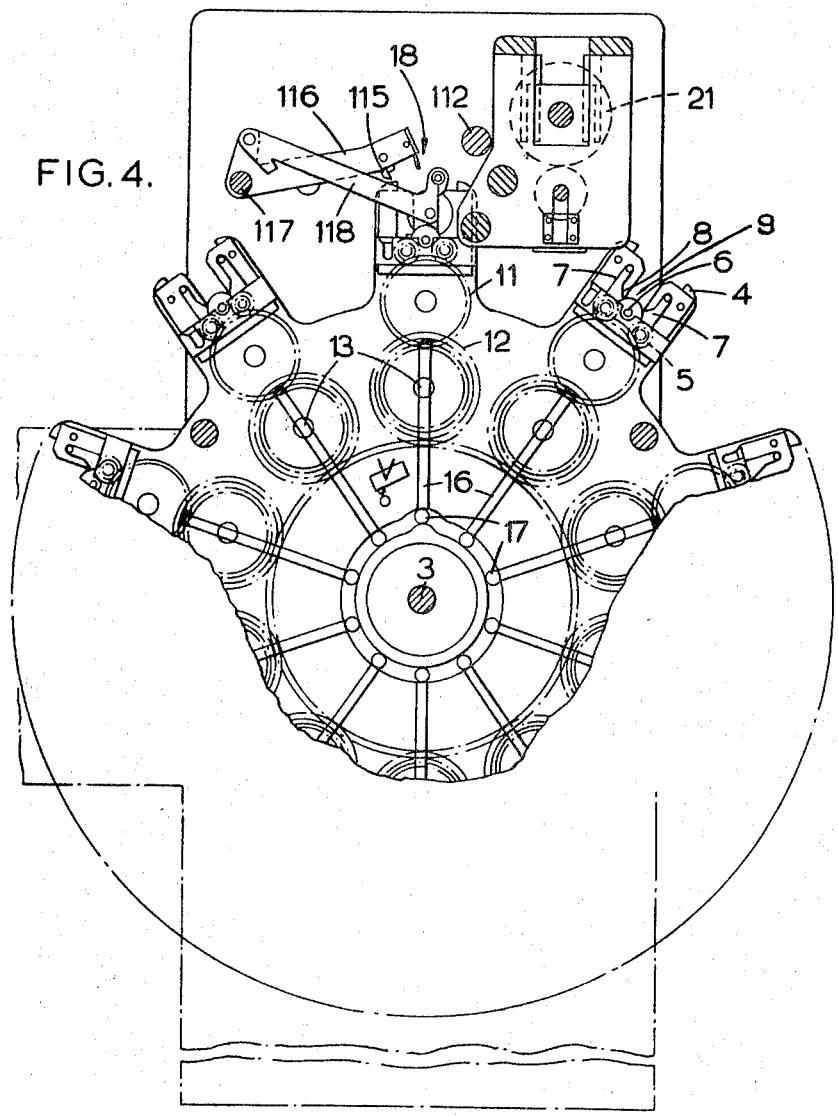
FIGURE 4 is an end section along the line IV—IV of FIGURE 2.

Turning to FIGURES 2–4 of the drawings there is seen a turret 1, supported in a frame 2 on an axial shaft 3 for angular displacement between successive mountings. The turret 1 is provided around its periphery with ten mountings 4, each having two idler rollers 5 in contact with a mandrel 6. Each mounting 4 is additionally provided with two spring loaded members 7 which are adapted to retain the mandrel 6 in the correct position. Each mounting 4 is also provided with a recess 9 for accommodating the guillotine knife 115.

The two rollers 5 which bear on the mandrel in order to drive it are in turn driven by a gear 11 from a further gear 12 mounted on a shaft 13. The shaft 13 supports a dog clutch 14 which may be moved into and out of engagement wtih a drive member 15 by an activating rod 16. The operation of this activating rod 16 is governed by a static cam 17 such that when one mounting moves adjacent the re-winding station 18, the dog clutch 14 is engaged and the drive for the rollers 5 passes via the gearwheel 19 mounted on the shaft 3 to a motor 20.

The motor 20 in addition drive sthrough a transfer clutch 22, either the slitting knives 21 through the slitting knife shaft 23, or a guillotine cam 24 for operation of the guillotine and tuck in mechanism.

The selection of one of these two functions is governed by the transfer clutch 22 having two alternative positions. During the cycle of operation the transfer clutch 22 will normally be in a position driving the slitting knives 21 via a chain 25. During chanveover, however, from one mounting 4 to another adjacent the re-winding station 18, rotation of the slitting knives 21 of the mandrel is not taking place. The alternate position of the transfer clutch is adopted to activate the guillotine cam shaft 24 via chain 26.

The rotation of the turret 1 is driven by a further motor 27 via a gear 28 mounted on a shaft 29 having a further gear 30 meshing with gearwheel 31 fixed to the turret 1. The time for which the motor 27 runs to alter the position of the turret is governed by a programming unit, which will be more fully described with reference to FIGURE 1.

In order that the turret may be successively stopped in the appropriate position with one mounting 4 opposite the re-winding station 18 an index plate 32 is fixedly attached to the turret 1 (see FIGURE 3). A solenoid B operating a plunger 33 is provided in the frame 2 for successive engagement with slots 34, each corresponding to a mounting of the turret, in order to lock the turret in a fixed position during re-winding of the rolls on a mandrel. The plunger 33 is also provided with a lug 35 for engagement with a microswitch U. The operation of the plunger will be described later in the specification with reference to FIGURE 1.

In order that the cut and tuck operation, during which time the rotation of the mandrel 6 is ceased, can be more fully described, reference should be made to FIGURES 5–9. These figures illustrate a combined web guillotine, and tucker for tucking the cutoff end of the web into a slot 36 in a new mandrel. Normally the paper on the mandrel is engaged by a heavyweight roller 111, which weights the mandrel 6 down on to the two driving rollers 5 in order to compact the re-wound roll tightly thereon. However, in order that the tucking operation for the new mandrel be carried out it is necessary that this roller 111 be removed in order that the tucker blade 114 may have access to the slot 36 of the mandrel 6.

The guillotine 115 and tucker blade 114 are mounted by each end thereof on an arm 116 which is pivotally mounted on the frame 2 such that the guillotine 115, being nearer to the pivot 117 of the arms 116 than the tucker blade 114, is thus more remote from the center line of the mandrel 6 than is the tucker blade 114.

The heavy roller 111 is journalled at each end thereof in a lever arm 118 each of which in turn is journalled on the respective arms 116 that carry the guillotine 115 and tucker blade 114, at a point 119 somewhat remote from the pivot 117 of the said guillotine and tucker blade arms 116.

The operation of this cut and tuck mechanism can be seen in successive positions in FIGURES 6–9, FIGURE 6 showing the position of the cut and tuck mechanism immediately after a new mandrel has been brought adjacent the re-winding station 18 and the tucking operation has been completed.

Figure 5:
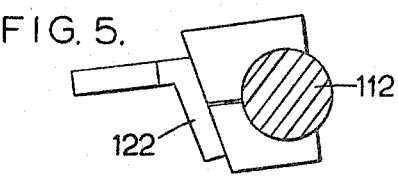
FIGURE 5 is a detail of FIGURE 4.
Figure 9:
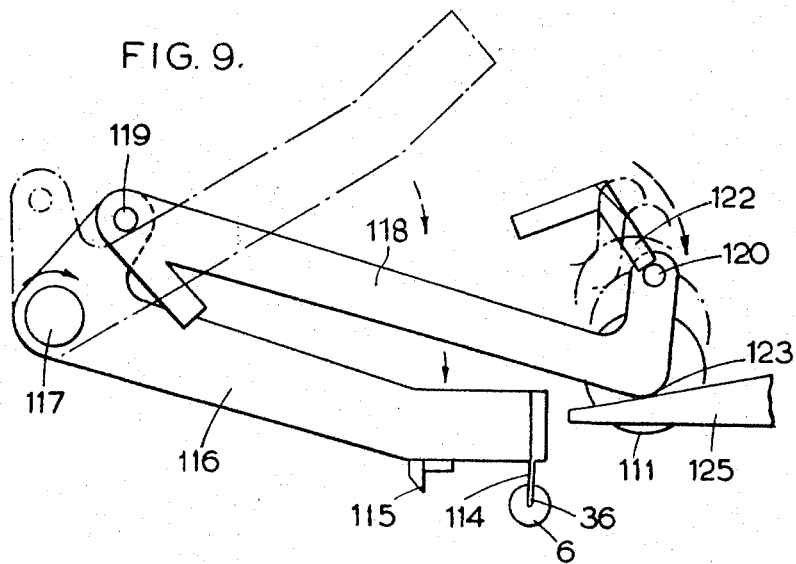

As the paper is wound on the mandrel 6 the heavy roller 111 is forced upwardly, thereby angularly displacing its lever arm 118 pivoting on the fulcrum 119. The spigots 120 provided on the outer end of each of the roller levers 118 then lift as seen in FIGURE 7a and subsequently over-ride detents 121 that are pivotally mounted on a roller platform 122 attached as seen in FIGURE 5 to a rod 112 which is fixedly attached to the frame 2 so that, when the spigots 120 have risen above these detents 121, they fall back into their original positions as seen in FIGURE 8A, where they are supported against downward movement. The guillotine tucker arms 116 then rotate about the pivot 117 under the control of the guillotine cam 24, to carry the tucker blade 114 and guillotine 115 down successively to sever the tapes and tuck the new end of the web into that slot of a new mandrel, which has meanwhile been substituted for the full mandrel by rotation of the turret.

As the guillotine and tucker arms 116 rotate, the pivot point 119 and thus, the arms 118 carrying the heavy roller 111 are moved forwardly so that the spigots 120 on the outer sides of the arms 118 ride across the top of the detents 121, and over the roller platforms 122 supporting them. The spigots 120 then fall partially off the said roller platform 122 until the elbow 123 of each lever 118 drops respectively on to a fixed shelf 125 mounted on each side of the frame 2. After completion of the severing and tucking operation, the levers 116 rotate anti-clockwise thus retracting the pivot 119 of the heavy roller levers 118 and drawing the spigots 120 off the fixed shelves 125 to permit the roller 111 to contact the tapes that have just been tucked into the slot of the new mandrel.

In order that the slot 36 of the mandrel 6 is correctly positioned (FIGURE 10) such that the tucker blade 114 engages therein correctly, each mandrel 6 is provided with a flange 131 on one end which is angularly fixed relative to the mandrel, said flange 131 having two freely rotatable rollers 132 mounted thereon one on either side of the axis 133 of the mandrel 6. This flange 131 is attached to the mandrel such that the slot 36, which may pass right through the mandrel, is at right angles to the line between the axes of the rollers 132. In this way when the line between the axes of the rollers 132 is held horizontal, the slot must be vertical as required for the tucker blade 114 to enter it during tucking.

Figure 10:
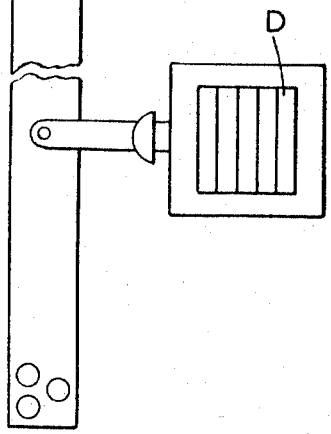
FIGURE 10 is a side view of the mandrel alignment arm.

In order to ascertain that the line between axes of the rollers 132 is arranged and held horizontal during tucking, there is provided a mandrel alignment arm 33 which is pivotally mounted on the frame 2 and which is provided with an extending member 134 in the form of a strip of metal. The operation of the mandrel alignment arm is governed by a solenoid D mounted on the frame 2 which is energised to angularly displace the arm 33 and extending member 134 from a rest position to the operative position shown in FIGURE 10, immediately prior to and during the time when the empty mandrel is positioned at the re-winding station 18 by indexing of the turret 1. This causes the end of the extending member 134 to engage one of the rollers 132 and tilt the flange 131 and thus, the mandrel to allow the member 134 to slide underneath the rollers 132 and ensure that the slot is vertical for tucking when the mandrel reaches station 18 as seen in FIGURE 10. The solenoid D is then de-energized to retract the arm 33 and its extending member 134 clear of the rollers 132 to allow free rotation of the mandrel during winding.

Figure 11:
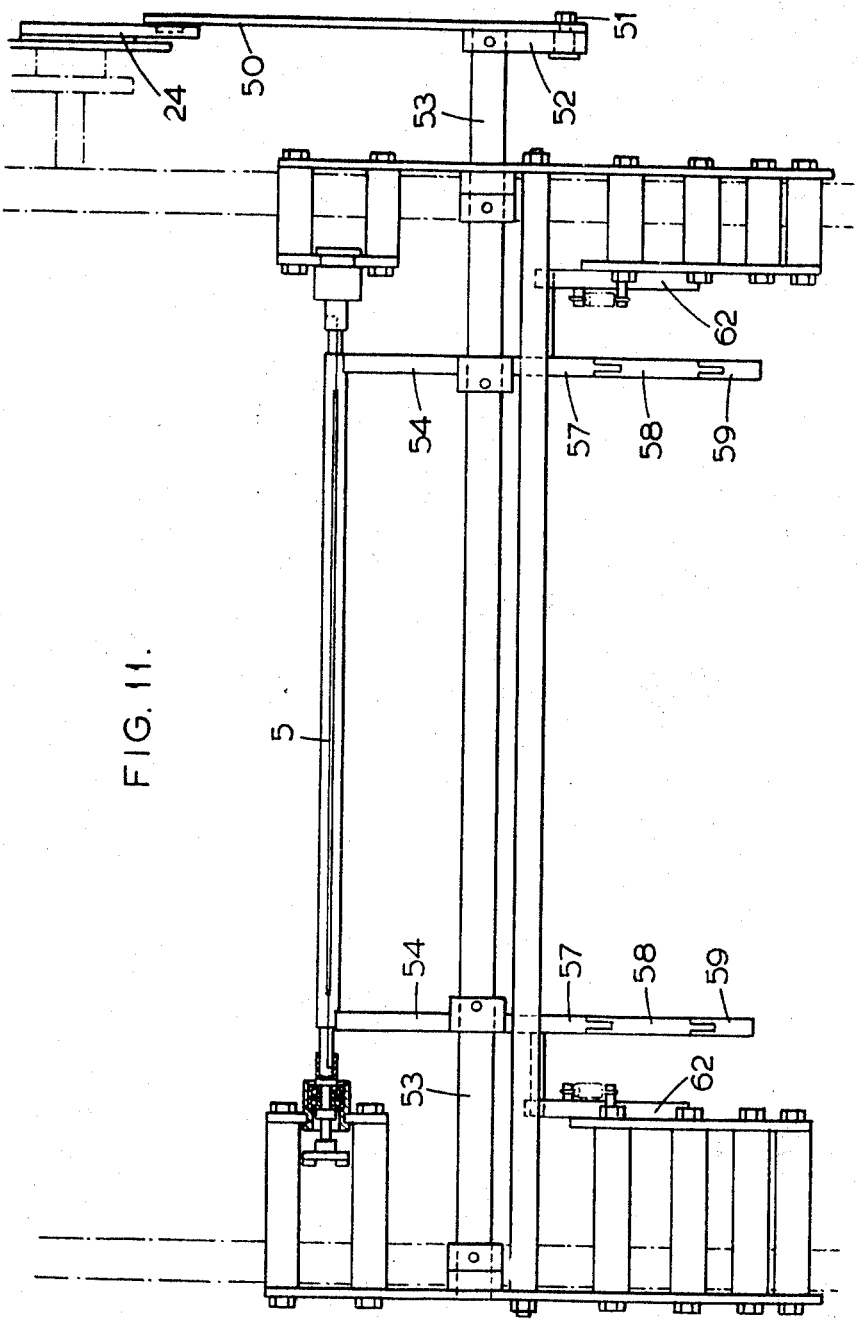
FIGURE 11 is a side view of the re-loading apparatus for the mandrel.
Figure 12:
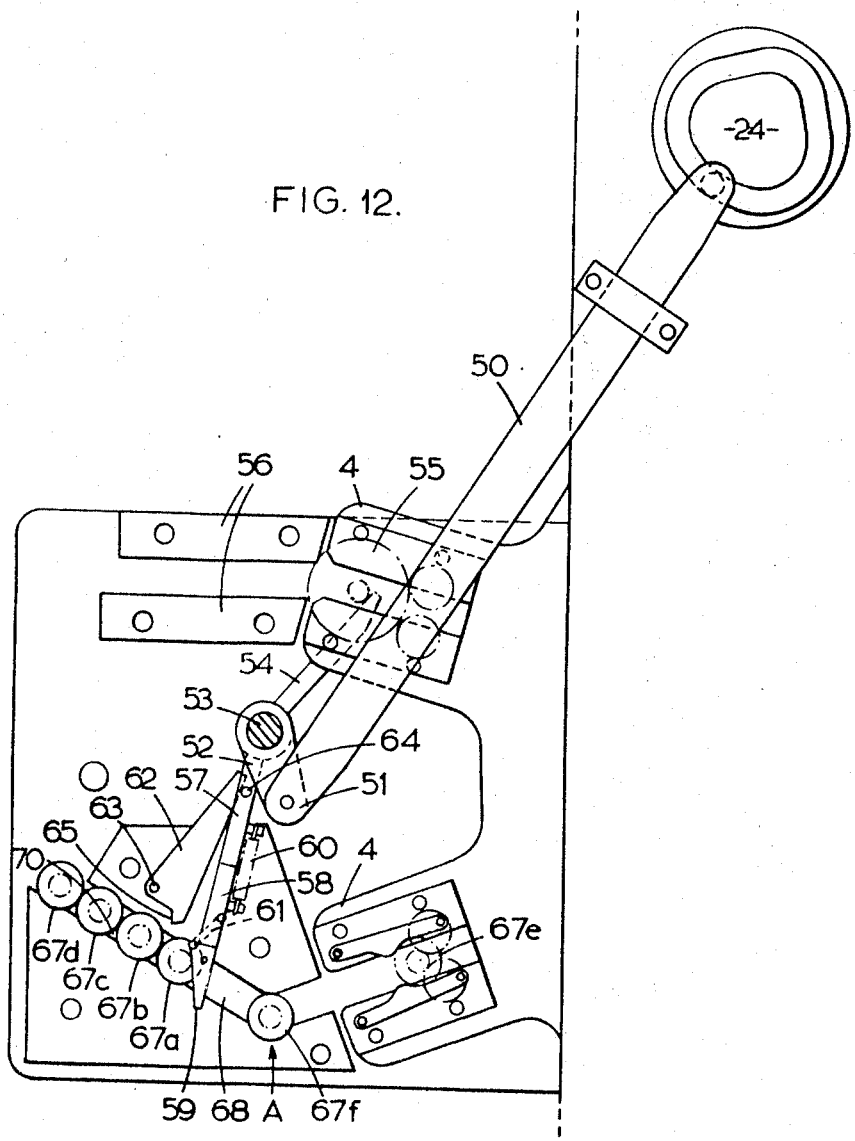
FIGURE 12 is an end view of the run-off mechanism.

The loading and unloading device is shown in FIGURES 11 and 12, the mandrels and turret being, for the sake of simplicity, removed from FIGURE 11.

The mechanism comprises the guillotine cam 24 supported adjacent frame 2 of the apparatus. This is adapted to actuate a cam rod 50 which is pivoted at one end 51 to a link 52 which in turn is fixedly attached to a main shaft 53. The main shaft 53 is also provided with a shoot-off or unloading lever 54 fixedly attached thereto such that angular displacement of the main shaft 53 equally causes angular displacement of the unloading lever 54. This lever 54 is adapted to engage the ends of a full mandrel 55 such that upon rotation of the guillotine cam 24 the unloading lever 54 moves in an anti-clockwise direction as shown in FIGURE 12 in order that the full mandrel is removed into the manual unloading bay between supporting members 56.

The loading mechanism for the new mandrels comprises a loading lever 57 having two extensions 58 and 59 which are spring loaded to restrain them in the position shown in FIGURE 12 but able to be broken in opposite directions against the actions of respective springs 60 and 61. A locking member 62 is also provided which is attached to the frame 2 of the apparatus. This locking member is pivoted at 63 and is spring loaded such that the end remote from the pivot point 63 bears against a lug 64 provided on the loading lever 57. The locking member is also provided with an upstanding lug 65 which is adapted to engage all the empty mandrels (67b, 67c and 67d) in the storage position 70 except the one (67a) which is to be introduced into a mounting 4.

In operation rotation of the guillotine cam 24 allows the rod 50 to move substantially upwardly as shown in FIGURE 12. This causes an angular displacement of the link 52, main shaft 53 and loading lever 57 and thus lug 64 in an anti-clockwise direction. This in turn allows the locking member 62 to pivot about the point 63 and bring the upstanding lug 65 into such a position that it prevents the mandrels 67b to 67d from moving.

The movement, however, of the loading lever 57 is such that the new mandrel 67a to be introduced into the mounting 4 is allowed to roll down the loading passage 68 to position 67f. Then lever 58 pushes the mandrel forward to position 67e and returns over the mandrel which has rolled into position 67f under its own momentum, by collapsing lever 59 with spring 61.

The spring 60 is positioned such that the loading lever 57 may be broken in a reverse direction to remove a mandrel 67f which has accidentally passed the extension 59.

It will be appreciated that this novel means of automatically loading and unloading mandrels from and to the various mountings on the turret that only one attendant is required to actually removed the rolls of paper from the full mandrels and to replace the then empty mandrels into the storage position 70.

Figure 1:
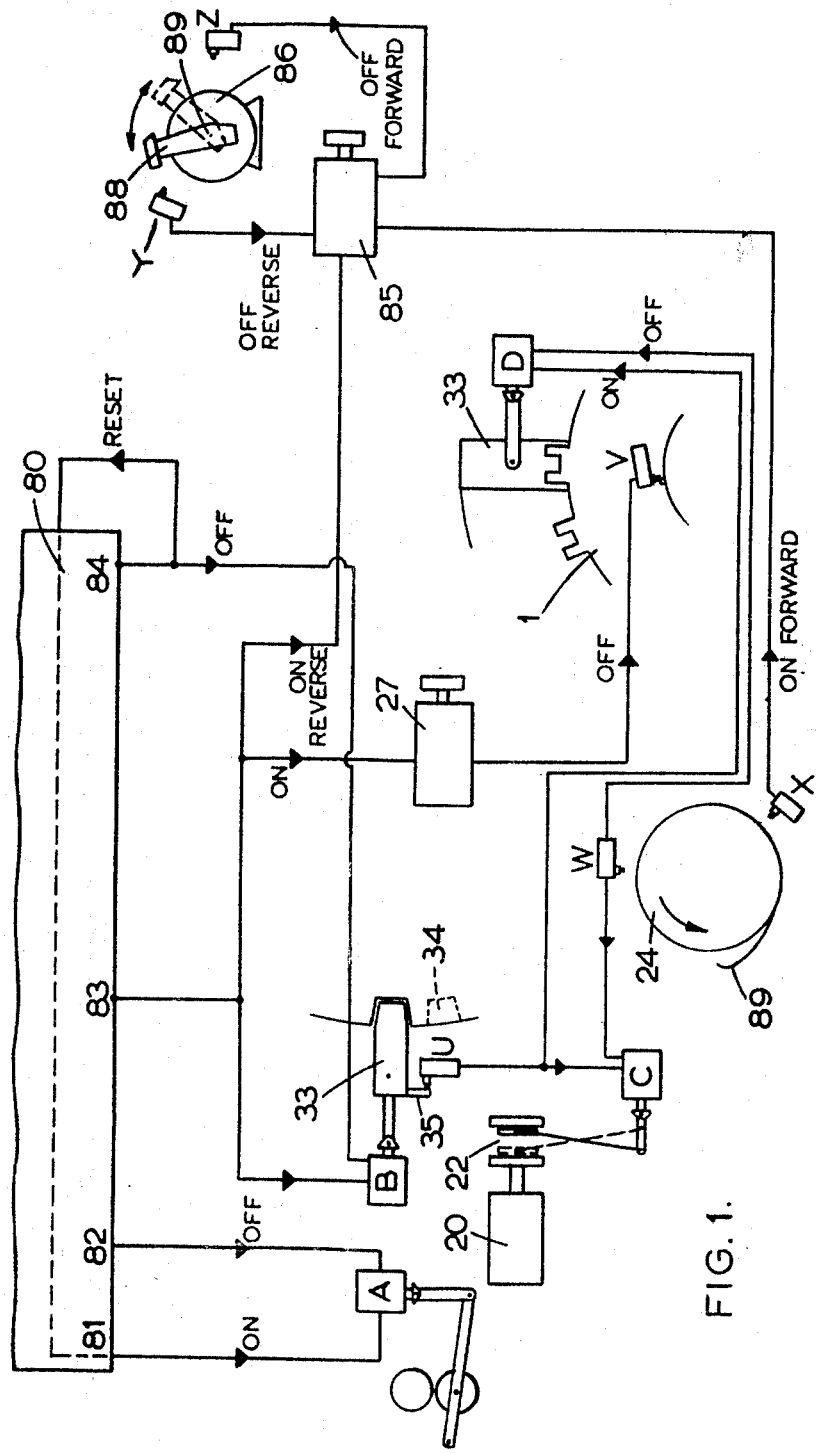
FIGURE 1 is a schematic layout diagram showing the operation of the apparatus.

The cycle of operation of the apparatus will now be described with specific reference to FIGURE 1.

The cycle may be considered as commencing as a mandrel is wound with paper to form a series of individual rolls on the mandrel. At a certain point, predetermined by the electronic programming unit 80 and dependent upon the number of turns of paper built up in each roll, and/or the diameter of the roll, the solenoid A is activated by the batch counter 81 to cause a red warning line to be marked on each roll. This is intended to warn the users of the roll that the roll is almost exhausted. The length of the line is determined by the period of time of operation and the solenoid A is pre-set to be turned off by the counter 82 at the required time.

When sufficient paper has been wound on the mandrel to form a complete set of rolls the counter 83 operates to cause solenoid B to withdraw the plunger 33 from the index plate 32. The operation of counter 83 also turns on the motor 27 to cause rotation of the turret and simultaneously turns on a speed control motor 85 to reduce the speed of a printing machine motor 86.

Each of these three simultaneous operations will now be described in more detail.

On operation of the solenoid B the plunger 33 is withdrawn from the index plate for a period in the region of one second. This has been found sufficient to allow the previous slot on the index plate to be rotated clear of the plunger and leave it free to drop into the next slot on the index plate when the turret has been rotated through the full 36°. The withdrawal of the plunger 33, however, also activates a microswitch U which in turn operates solenoid C to cause the transfer clutch 22 driven from the motor 20 to change from the position driving the slitting knives 21 to its alternate poistion in which it drives the guillotine cam. During the cycle of operation the guillotine cam 24 makes one complete revolution in an anti-clockwise direction as shown in FIGURE 1, to stop immediately after tripping micro-switch W. In addition activation of the micro-switch U causes solenoid D to be energised to cause the mandrel alignment arm to be moved upwardly to engage and correctly position the mandrel located in the successive mounting. The motor 27 driving the turret is energised until the plunger 33 is ready to fall into successive slot 34.

The speed of the printing machine motor 86, which is of the variable speed type, is governed by the position of an arm 88 mounted on the spindle 89 of the printing machine motor 86. This arm is adapted to be angularly displaced through approximately 120° to vary the speed of the printing machine motor, the displacement of the arm 88 being governed by the speed control motor 85. As stated, the counter 83 starts the speed control motor which causes the arm 88 to move from its position against the micro-switch Z in an anti-clockwise direction as shown in FIGURE 1 to reduce the speed of the printing machine motor 86. When the arm 88 engages the mirco-switch Y, the latter cuts out the speed control motor 85 with the speed of the printing machine motor 86 at its minimum speed. This is to allow for the cutting and tucking operation as heretofore described and which takes place before the shoe 89 on the guillotine cam 24 reaches the micro-switch X.

When the shoe 89 trips the micro-switch X the speed control motor is again started to move the arm 88 in a clockwise direction to increase the speed of the printing machine motor 86. The arm 88 is again brought to rest by tripping micro-switch Z which cuts out the speed control motor 85 and allows the printing machine motor 86 to run at full speed for the normal build-up of the paper rolls.

The guillotine cam however continues its revolution to trip the micro-switch W. This in turn de-energizes the solenoid C to cause the transfer clutch 22 to revert to its original position driving the slitting knives, i.e. to the position for normal running, and to thereby disconnect the drive to the guillotine cam 24. Operation of this micro-switch W also causes the solenoid D to be de-energised to allow the mandrel alignment arm 33 to swing in an anti-clockwise direction as shown in FIGURE 10 of the drawings to a rest position.

The cycle is then complete and the new mandrel is wound.

From this description it will be noted that, mostly connected with an inline machine, it can produce printed or embossed (or both) reels of, for instance, wallpaper, wrapping paper, etc. or, with the cutting arrangement will provide a continuous flow of narrow reels such as gummed coils, tickets, stamps, etc.

I claim:

1. Apparatus for rewinding a web into a series of separate rolls comprising a frame, a turret rotatably mounted in said frame, mandrels, a series of mountings for rotatably supporting said mandrels equally distributed around the periphery of said turret, means for rotating said turret intermittently, index means for registering said turret in any one of a plurality of angular positions in each of which a mandrel mounting is located at a web rewinding station on said frame, means for rotatably driving a mandrel carried in a mandrel mounting when located at said rewinding station to rewind web onto that mandrel from a source of web, means for disengaging the drive to that mandrel when a desired amount of web has been rewound thereon and operating said turret rotating means to displace that rewound mandrel from the rewinding station and replace it by an empty mandrel carried in an adjacent mandrel mounting, a guillotine arranged to sever said web after that rewound mandrel has been so displaced and means for engaging the severed supply end of said web with that empty mandrel including a tucker blade arranged to tuck the severed end into a radial slot provided along the length of the mandrel.

2. Apparatus as claimed in claim 1, wherein said guillotine is carried on a guillotine arm which is pivotally mounted on said frame and operably connected with a guillotine cam, and wherein said tucker blade is also carried on said guillotine arm.

3. Apparatus as claimed in claim 2, including rotary slitting knives arranged to slit the web before rewinding and a two position clutch which in one position is arranged to transmit a drive to said slitting knives and in the other position is arranged to transmit a drive to said guillotine cam to operate said guillotine and said tucker blades.

4. Apparatus as claimed in claim 3, wherein said index means includes an index plate attached to said turret having a series of slots distributed equally around its periphery and a plunger slidably mounted in said frame to engage one of said slots and so angularly locate said turret, or to retract therefrom and so allow rotation of said turret.

5. Apparatus as claimed in claim 4, wherein said plunger is arranged to initiate operation of said two position clutch so that when said plunger is engaged with said index wheel said two position clutch is moved to said one position and when said plunger is retracted said two position clutch is moved to said other clutch position.

6. Apparatus as claimed in claim 2, wherein the mandrel drive means includes at least one drive roller rotatably mounted in said turret at each mandrel mounting so as to drivably engage a mandrel carried in the respective mounting, and each such roller is driven by way of a winding clutch which is actuated by a cam follower carried on said turret in operative engagement with a stationary cam carried on said frame concentrically with said turret.

7. Apparatus as claimed in claim 2, including means for angularly positioning a mandrel in said turret at said rewinding station so that said tucker blade may freely enter the slot in that mandrel comprising an aligning member movably mounted on said frame from a first position in which it engages with and aligns two freely rotatably rollers which are mounted on one end of each mandrel as that mandrel approaches said rewinding station during rotation of said turret, to a second position in which it is clear of such freely rotatable rollers on a mandrel at said rewinding station.

8. Apparatus as claimed in claim 2, including means for removing a full mandrel from its mounting to an unloading position comprising a pivoted arm arranged to engage the full mandrel and to be pivoted on rotation of the guillotine cam to cause the mandrel to move in to an unloading position.

9. Apparatus as claimed in claim 2, in which the means for loading an empty mandrel into a mounting includes a downwardly inclined loading passage down which an empty mandrel is allowed to move when required for loading so that it gathers sufficient momentum to pass into the requisite mounting between spring loaded members for retaining it.

10. Apparatus as claimed in claim 9, in which the loading passage is arranged to receive a plurality of empty mandrels and includes a release member movable on rotation of the guillotine cam to release the downmost of said mandrels and a retaining member movable on rotation of the guillotine cam to prevent downward movement of the remainder of said mandrels.

11. Apparatus as claimed in claim 2, when used in connection with a printing machine and including means for slowing down the printing machine during rotation of the turret.

12. Apparatus as claimed in claim 2, wherein a heavy roller is arranged to weight down on a mandrel in said rewinding station in order to compact the rewound web tightly thereon, said roller being rotatably carried on a roller arm which is pivotally mounted on said guillotine arm at a point eccentric from the guillotine arm pivot point.

13. Apparatus as claimed in claim 12, including a detent pivotally connected to said frame, and a spigot on said roller arm positioned beneath said detent whereby when said roller is lifted as the diameter of the web being rewound on a mandrel increases, the spigot lifts up said detent and then overrides the detent.

14. Apparatus as claimed in claim 13, wherein a roller platform is connected to said frame and positioned above said spigot, said detent is pivotally connected to said roller platform whereby when said guillotine arm is moved to operate and sever the web, said spigot rides across the top of said detent and said roller platform to carry said roller clear of a mandrel in the rewinding station.

15. Apparatus as claimed in claim 14, wherein said eccentric pivot point of said roller arm is positioned on said guillotine arm whereby when said guillotine arm is returned to its inoperative position after severing the web, said roller is carried back to a position to weigh down on a mandrel in the rewinding station.

References Cited

UNITED STATES PATENTS

| 2,237,759 | 4/1941 | Kwitek | 242—56 |
| 2,586,832 | 2/1952 | Kohler | 242—56 |
| 2,620,141 | 12/1952 | Langbo | 242—56 |
| 2,970,786 | 2/1961 | Justus et al. | 242—56 |
| 3,127,122 | 3/1964 | Roshkind | 242—56 |

GEORGE F. MAUTZ, Primary Examiner

U.S. Cl. X.R.

242—56, 64